(12) United States Patent
Baumann et al.

(10) Patent No.: US 8,187,762 B2
(45) Date of Patent: May 29, 2012

(54) FUEL CELL COOLING DEVICE WITH ION EXTRACTION MEDIUM

(75) Inventors: Frank Baumann, Mundelsheim (DE); Florian Wahl, Lohr (DE); Alexander Martin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 962 days.

(21) Appl. No.: 12/117,078

(22) Filed: May 8, 2008

(65) Prior Publication Data

US 2008/0286618 A1 Nov. 20, 2008

(30) Foreign Application Priority Data

May 14, 2007 (DE) .......................... 10 2007 022 583

(51) Int. Cl.
*H01M 8/04* (2006.01)
*F28D 15/00* (2006.01)
*F28F 13/12* (2006.01)

(52) U.S. Cl. ........ 429/434; 429/433; 429/435; 429/436; 429/437; 429/438; 165/104.33; 165/109.1

(58) Field of Classification Search .................. 429/434, 429/433, 435–438; 165/104.33, 109.1
See application file for complete search history.

(56) References Cited

U.S. PATENT DOCUMENTS

| | | | |
|---|---|---|---|
| 7,208,605 B2 | 4/2007 | Davis, Jr. | |
| 7,304,200 B2 | 12/2007 | Roettger et al. | |
| 2004/0028963 A1* | 2/2004 | Kormann et al. | ............... 429/13 |
| 2004/0253490 A1 | 12/2004 | Wulff et al. | |

FOREIGN PATENT DOCUMENTS

| | | |
|---|---|---|
| DE | 102 01 276 | 7/2003 |
| DE | 10 2005 025 315 | 12/2006 |
| EP | 1 019 322 | 7/2000 |
| EP | 1 476 408 | 11/2004 |

OTHER PUBLICATIONS

Wei et al., Room temperature ionic liquid as a novel medium for liquid/liquid extraction of metal ions, May 2003, Analytica Chimica Acta, 488, 183-192.*
Huddleston et al., Room temperature ionic liquids as novel media for 'clean' liquid-liquid extraction, Jan. 1998, Chemical Communications, 1998, 1765-1766.*

* cited by examiner

*Primary Examiner* — Basia Ridley
*Assistant Examiner* — Sean P Cullen
(74) *Attorney, Agent, or Firm* — Michael J. Striker

(57) ABSTRACT

A fuel cell cooling device has a cooling loop for circulating a coolant fluid. At least during the operation of the fuel cell, an ion extraction medium that is in the liquid state is provided. A method for cleaning a coolant with a corresponding fuel cell cooling device is provided as well.

12 Claims, 5 Drawing Sheets

FUEL CELL COOLING DEVICE WITH ION EXTRACTION MEDIUM

CROSS-REFERENCE TO A RELATED APPLICATION

The invention described and claimed hereinbelow is also described in German Patent Application DE 102007022583.2 filed on May 14, 2007. This German Patent Application, subject matter of which is incorporated herein by reference, provides the basis for a claim of priority of invention under 35 U.S.C. 119(a)-(d).

BACKGROUND OF THE INVENTION

The present invention relates to a fuel cell cooling device and to a method for its operation.

For operating fuel cells, it is known to use cooling media, in particular cooling loops that contain a coolant fluid. In using liquid cooling media, the increase in the (electrical) conductivity of the coolant fluid over the period of operation proves to be especially disadvantageous. To reduce the conductivity of this cooling medium, it is known to use ion exchangers.

SUMMARY OF THE INVENTION

The object of the present invention is to improve both a fuel cell cooling device of the type referred to at the outset and a method for its operation.

In keeping with these objects and with others which will become apparent hereinafter, one feature of the present invention resides, briefly stated, in a fuel cell cooling device, comprising a cooling loop for circulating a coolant fluid; and an ion extraction medium which is in a liquid state and is provided at least during an operation of the fuel cell.

Another feature of the present invention resides, briefly stated, in a method for operating a fuel cell cooling device, comprising the steps of circulating a coolant fluid in a the coolant loop; and performing an ion extraction from the coolant fluid at least during an operation of the fuel cell by an ion extraction medium which is in a liquid state.

Accordingly, the present invention relates to a fuel cell cooling device having a cooling loop for circulating a coolant fluid. It is characterized in that at least during the operation of the fuel cell, an ion extraction medium that is in the liquid state is provided.

Using an extraction medium has the advantage over using an ion exchanger medium, or a device operated with that medium, that it correctly removes dissolved ions from the cooling medium, in particular a coolant fluid, that is to be cleaned, rather than merely replacing certain unwanted ions with others. This kind of construction of a fuel cell cooling device also has the advantage over the previously known prior art there is no need to change the cleaning agent, for instance by replacing exchangers, which was necessary in the prior art when a certain degree of saturation was reached. The effectiveness of the ion extraction medium, as will be described in further detail hereinafter, can be accomplished by precipitating out contaminants at a fundamentally arbitrary location in the device, for instance by means of an electrochemical process. The cleaned ion extraction medium can then be made available once again for the extraction process.

As the ion extraction medium, an ionic liquid is especially advantageously proposed for use. The term ionic liquids is understood to mean low-melting salts with melting points below 80° Celsius. They are not volatile and have no vapor pressure, or a vapor pressure that is hardly measurable. Depending on the composition of the cation/anion pair, many ionic liquids are already known that also have a melting point below room temperature down to −30° C. Representative cations of such low-melting ionic liquids are mono-, di- and/or trialkyl-substituted imidazolium, pyridinium, pyrrolidinium, pyrazolium, triazolium, guandinium, morpholinium, and ternary-substituted alkylsulfonium cations.

The alkyl groups can be chains that contain unbranched and branched $C_1$-$C_{20}$ carbon and can contain additional hetero atoms in the form of an ether group, thioether group, ester group, siloxane group, or amide group.

It is also possible to substitute fluorine for hydrogen in the course of partial fluorination, to the point of perfluorination of the alkyl radicals, is also possible.

Corresponding anions are halides (Cl—, Br—, I—), tetrafluoroborate ($BF_4^-$), hexafluorophosphates ($PF_6^-$), tri(pentafluoroethyl) trifluorophosphate (($C_2F_5)_3PF_3^-$), hexafluoroantimonate ($SbF_6^-$), sulfate (SO42-), organic sulfates R—O—SO3-, organic sulfonic acids R—SO3-, bis(sulfon) imides R—SO2-N—SO2-R, and carboxylates R—COO—, with an R=C1-C12-alkyl chain or a tolyl radical, sometimes with different degrees of fluorination.

A selection of concrete ionic liquids is listed below, but without limiting the material category of the ionic liquids for that use: N-butyl-N-trimethylammonium bis(trifluoromethylsulfonyl)imide, diethylmethylsulfonium bis(trifluoromethylsulfonyl)imide1-butyl-3-methylpyrrolidinium bis(trifluoromethylsulfonyl)imide, 1-tert-butyl-3-methylim idazolium bis(trifluoromethylsulfonyl)imide, 1-octyl-3-isopropylimidazolium tris(pentafluoroethyl)trifluorophosphate, and tri (hexyl)tetradecylphosphonium tris(pentafluoroethyl)trifluorophosphate.

To attain the best possible cleaning effect for the cooling medium, the provision of a mixing unit for mixing the coolant with the ion extraction medium will be proposed hereinafter. By means of such a mixing unit or "washing cell", the largest possible effective surface area can be created between the coolant to be deionized and the ion extraction medium that extracts the ions. This results in an optimal cleaning process, since the larger the effective surface area between the two media, the greater the cleaning effect.

Dispersal means for the coolant and/or the ion extraction medium can also be especially advantageously provided for this purpose. That is, both the coolant and the ion extraction medium, or both, can be dispersed, to attain the largest possible effective surface area. In a preferred embodiment, such a dispersal means could for instance include an injection and/or spray device for mixing the ion extraction medium with the coolant.

This kind of injection or spray device on the one hand causes the medium that is to be injected or sprayed in to be capable of itself being finely distributed, so that it already itself has a large surface area. On the other hand, because of such injection or spraying, the portions of the applicable medium that have been distributed or even made into a mist by the nozzle effect can be introduced into the complementary medium in such a way that they are distributed over the largest possible volume and can be made effective along with the medium. Possible embodiments would for instance be one or more injection nozzles. However, Venturi nozzles are also excellently suited for the purpose.

To reinforce the ion extraction, a turbulence generating unit can be provided as well. It can for instance likewise be embodied in the form of nozzles that introduce one or another medium into its complementary fluid under pressure. However, a mixture of the two media or a portion of this mixture can also bring about even more-intensive mixing by being introduced into a volume located outside the nozzle. Alternatively or in addition, the turbulence generating unit may, however, also include a stirring mechanism, which can reinforce the mixing of the two media with one another.

To enable separating the ion-laden extraction medium from the cooling medium after the cooling medium has been cleaned, the provision of a separation unit is also proposed. In an especially preferred embodiment, this unit can effect the separation process, for instance by utilizing the physical and/or chemical properties of one or the other medium or of both. For instance, with components that are soluble in one another only with difficulty if at all, the embodiment of a so-called "two-phase boundary" can be utilized, which occurs because of the different densities or solubilities of the two media in one another. It would also be conceivable here for instance to use wash plates and/or overflow chambers and/or separating funnel devices, as a result of which the portion of the mixture having the lesser density can be withdrawn at the top, and the portion with the higher density at the bottom, from a suitably constructed device.

To enable preparing the ion-laden ion extraction medium that is extracted from the coolant by liquid-liquid extraction, a suitable preparation unit may also be provided. As a result, the foreign ions, which may for instance be metal ions, that are picked up during the cleaning operation can be precipitated out metallically at electrodes by means of an electrochemical process or precipitated out as salts by the addition of suitable precipitation agents.

After the re-preparation of the ion extraction medium, this ion extraction medium can be furnished once again for ion extraction from the cooling medium. For this purpose, an example of a circulation course that is also suitable is one which in addition to the ion extraction process from the cooling medium also has the advantage of a further export of energy in the form of heat absorption from the cooling medium, or in other words that can form a second cooling loop. Optionally, this so-called second cooling loop can also be equipped with a cooling unit, such as a radiator, which can optionally also additionally have a fan for reinforcement in dissipating the absorbed heat.

In addition to the fuel cell cooling device described above, the present invention also relates to a corresponding method for operating a fuel cell having such a fuel cell device. Such a method is distinguished in that at least during the operation of the fuel cell, an ion extraction from the coolant fluid is performed by means of an ion extraction medium that is in the liquid state. It is especially advantageously proposed that the ion extraction performed by means of the ion-extracting means is performed continuously. An advantage of this kind of continuous ion extraction can for instance be that the components required for this can be embodied as comparatively small, since because of the continuous deionization process, the proportion of foreign ions in the medium can be kept comparatively constantly slight.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
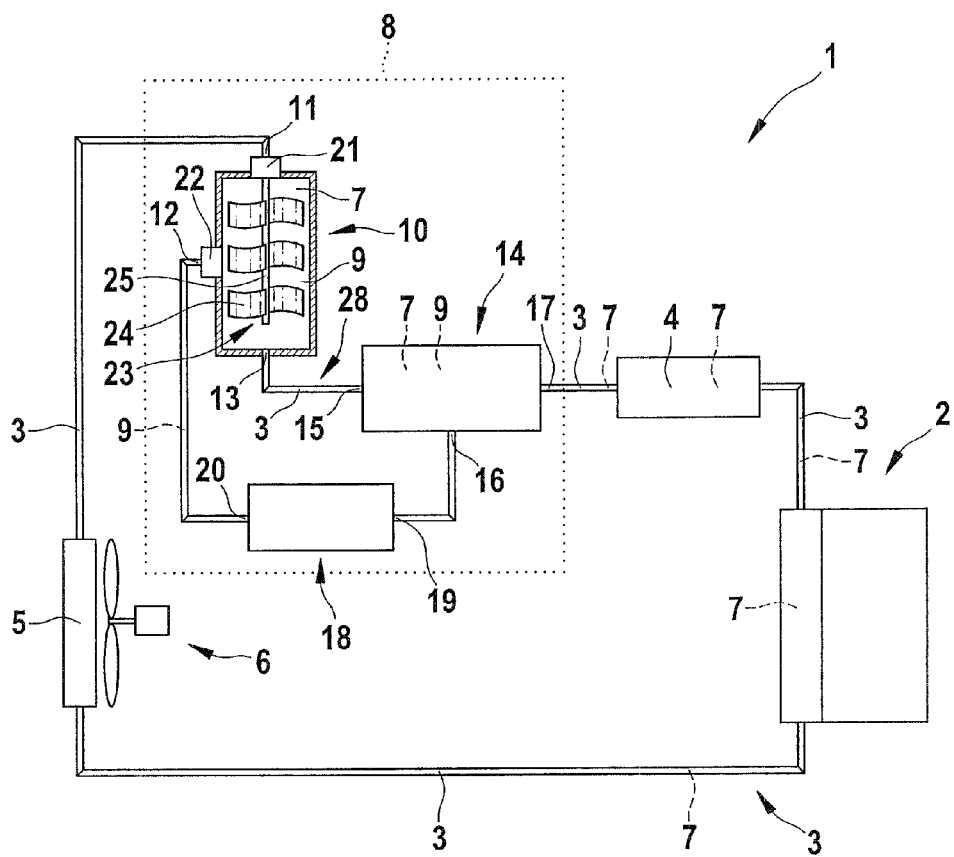
FIGS. 1 and 2 schematically show a fuel cell cooling device in two different versions.

In detail, FIG. 1 is a schematic view of a fuel cell cooling device 1. It includes for instance a fuel cell 2, a coolant loop 3, a coolant pump 4, and a radiator 5 with an associated fan 6. The coolant 7 flows through these components to cool the fuel cell.

To avoid short circuiting the fuel cell, care must therefore be taken that the cooling medium have the least possible electrical conductivity. To that end, deionization of the coolant 7 is proposed according to the invention by means of the coolant preparation unit 8. This coolant preparation unit 8 includes for one thing an ion extraction medium 9 which at least during the operation of the fuel cell is in a liquid state. In an especially preferred embodiment, this is an ionic liquid 9.

The coolant preparation unit 8 furthermore includes a mixing unit or so-called wash cell 10, in which the coolant, laden with foreign ions, is put together with the ion extraction medium and mixed in preparation for being cleaned by a deionization process. For connecting the various lines, the mixing unit 10 has a coolant inlet 11, an ion extraction medium inlet 12, and a mixture outlet 13.

Downstream of the mixing unit in the coolant loop, a separation unit 14 is provided, which has a mixture inlet 15, an ion extraction medium outlet 16, and a coolant outlet 17. The coolant outlet 17 closes the coolant loop by means of the communication with the coolant pump 4.

The ion extraction medium is conversely carried to the inlet 19 of a preparation unit 18 and leaves the preparation unit through the outlet 20, and then is returned to the deionization process of the coolant 7, for instance via the ion extraction medium inlet 12.

To achieve the most thorough possible mixing of the coolant with the ion extraction medium, dispersal means 21, 22, for the coolant and for the ion extraction medium, respectively, are provided. In this view of an example, they are shown at the two inlets 11, 12 to the mixing unit 10. They may for instance be embodied as an injection and/or spray device, for instance in the form of a nozzle, and in particular an injection nozzle and/or Venturi nozzle or the like.

A turbulence generating unit 23, however, is also excellently well suited to enlarging the effective surface of the two media for the ion extraction from the coolant. A turbulence generating unit 23 of this kind is shown as an example in the interior of the mixing unit or wash cell 10, in the form of multi-vaned beaters 24, which can rotate about an axis 25.

Figure 2:
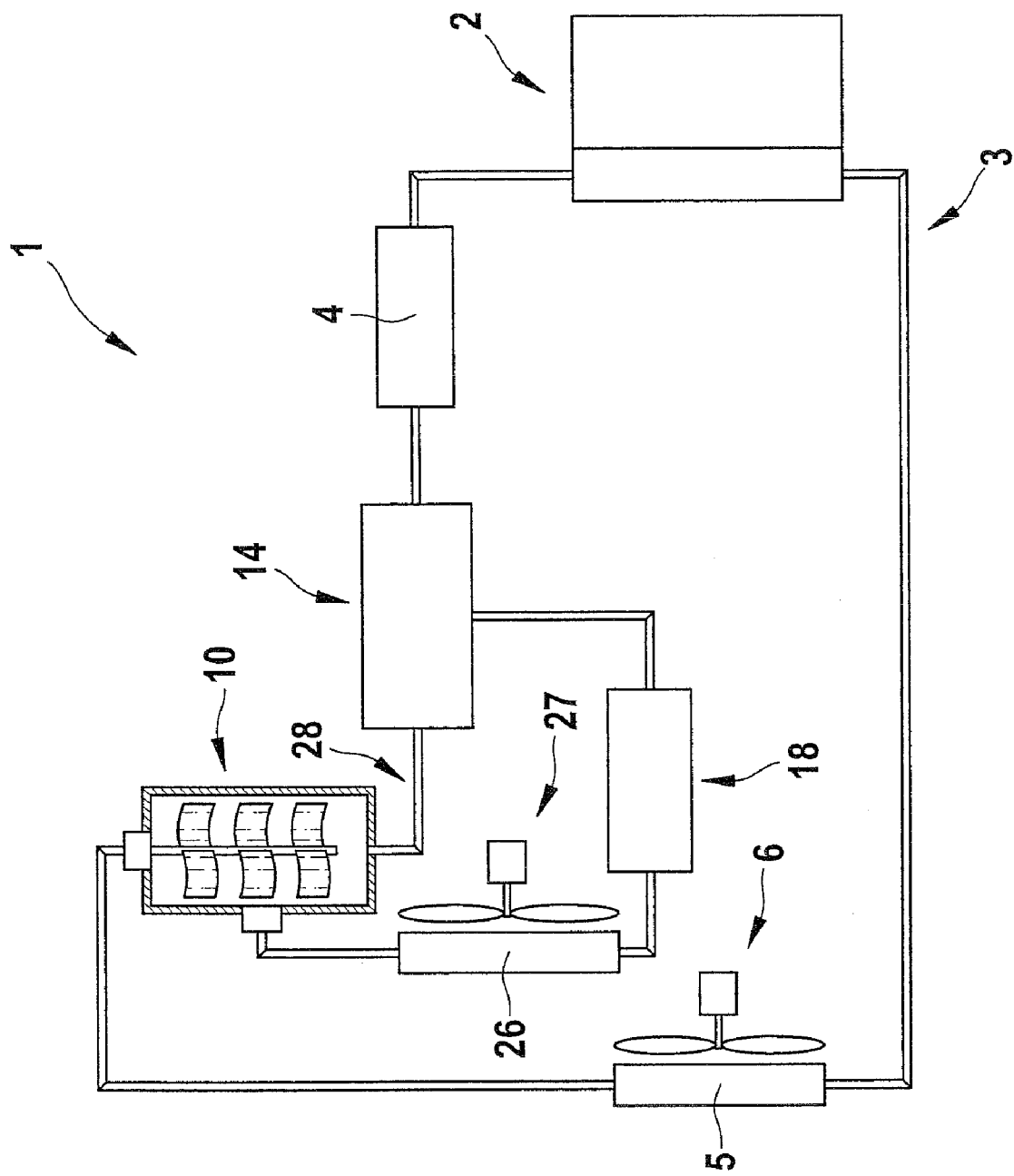

FIG. 2 shows an embodiment of a fuel cell cooling device 1 that is modified compared to FIG. 1 in such a way that it has an additional cooling device for the ion extraction medium loop 28, in the form of a radiator 26 and a fan 27 associated with it as an example. The other components of the fuel cell cooling device are equivalent to those of FIG. 1 and are accordingly identified by the same reference numerals. For the sake of simplicity, individual details of FIG. 1 will not be repeated here.

Figure 3:
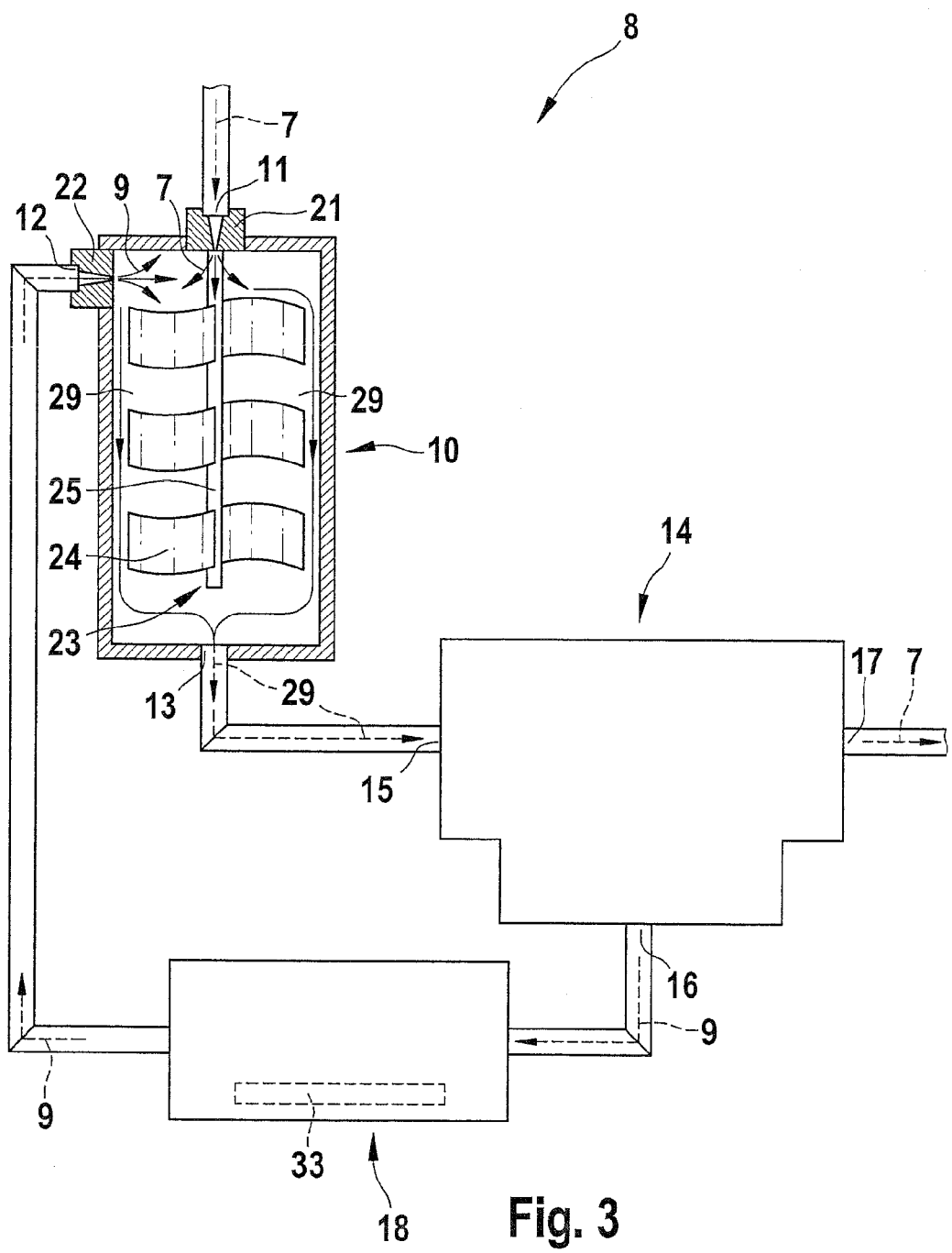
FIG. 3 shows a further view of a fuel cell cooling device.

FIG. 3 is a schematic view of details of the individual components of the coolant preparation unit 8. The somewhat larger view shows the dispersal of the coolant 7 by the dispersal means 21, which can be embodied for instance as an injection nozzle or a Venturi nozzle. This kind of injection of ion extraction medium 9 is illustrated by the likewise fanned-out arrows after the medium has flowed through the applicable dispersal means 22 in the inlet 12 of the mixing unit 10. This dispersal means can again be embodied for example as an injection or Venturi nozzle. These two dispersal means are shown only as examples; in certain embodiments it is entirely possible for only one of the two means to be of this kind. Mixing the two complementary fluids of the cleaning process according to the invention using only a turbulence generating unit 23 is also conceivable.

The mixing of the cooling medium 7 with the ion extraction medium 9 is indicated symbolically by the arrows 29. These media originate in the injection region of the two inlets 11 and 12, leave the mixing unit or wash unit 10 through the mixture outlet 13, and pass via the mixture inlet 15 into the separation unit 14. In this separation unit, the cooling medium is separated from the ion extraction medium so that the two media each leave the preparation unit 14 through the respective outlets 16 and 17 assigned to them as indicated by the corresponding arrows 7 and 9.

Figure 4:
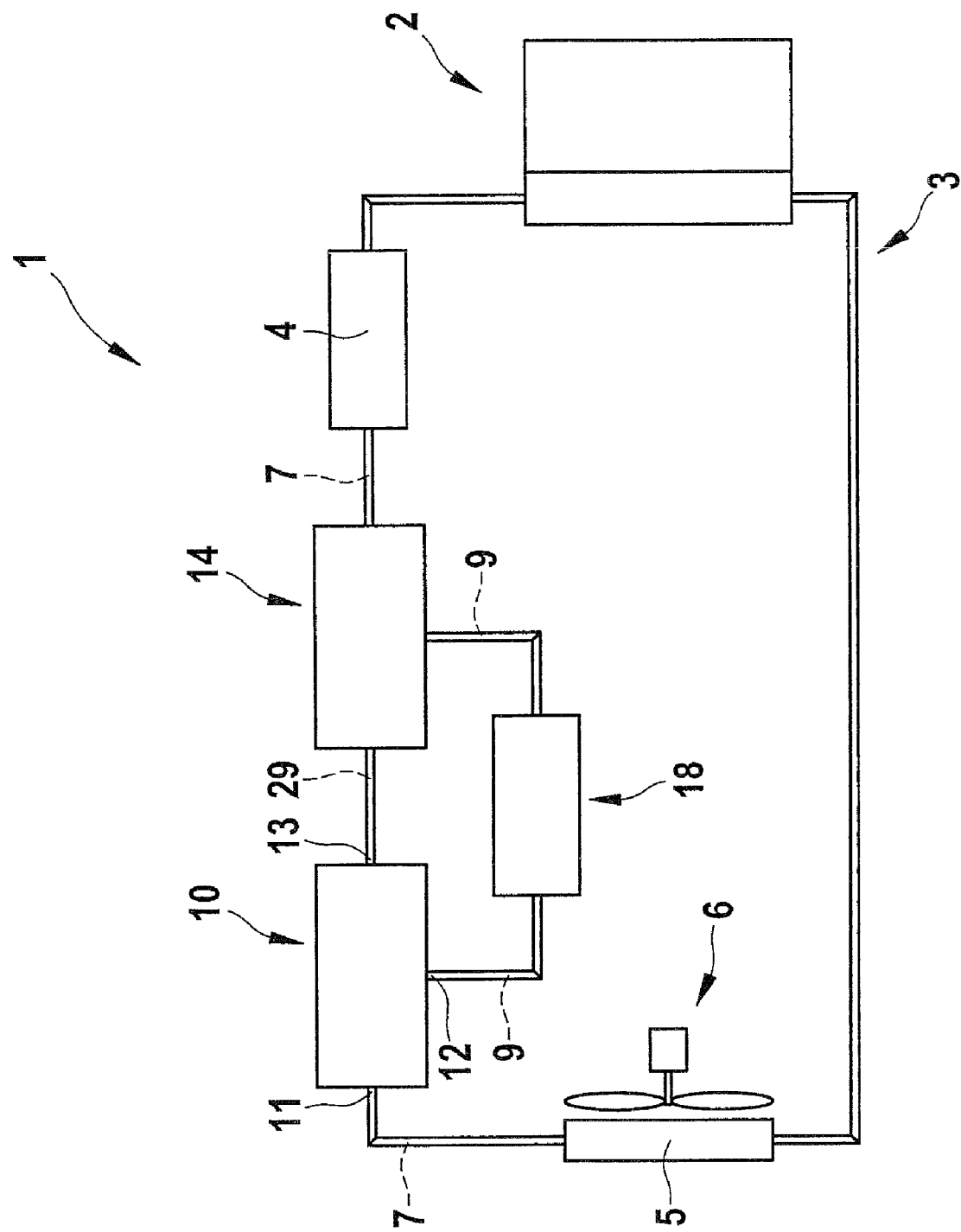
FIG. 4 shows a further schematic illustration of a version of a fuel cell cooling device that is modified compared to what is shown in FIGS. 1 and 2.

FIG. 4 shows a further embodiment of a fuel cell cooling device 1, which compared to the embodiments shown in FIGS. 1 and 2 is itself constructed as a Venturi nozzle. It functions in such a way that because of the circulation, generated by the coolant pump 4, of the cooling medium 7 in the coolant loop 3, an aspiration of the ion extraction medium 9 takes place through the inlet 12. Given a suitable embodiment of the inlet 12, the ion extraction medium is dispersed, which can extend to the point of complete dispersal. Thus once again, a large surface area that is effective in cleaning is achieved to facilitate the ion extraction from the cooling medium.

After the mixture 29 has exited through the outlet 13, the precipitation of cooling medium from the ion extraction medium 9 can take place in the separation unit 14 in the manner already described above; the ion extraction medium in turn can be cleaned, in the preparation unit 18, for instance by means of electrochemical precipitation, of the foreign ions that have been picked up. As possible electrodes (33) for this purpose, platinum electrodes or other noble metals or carbon electrodes may be used.

Figure 5:
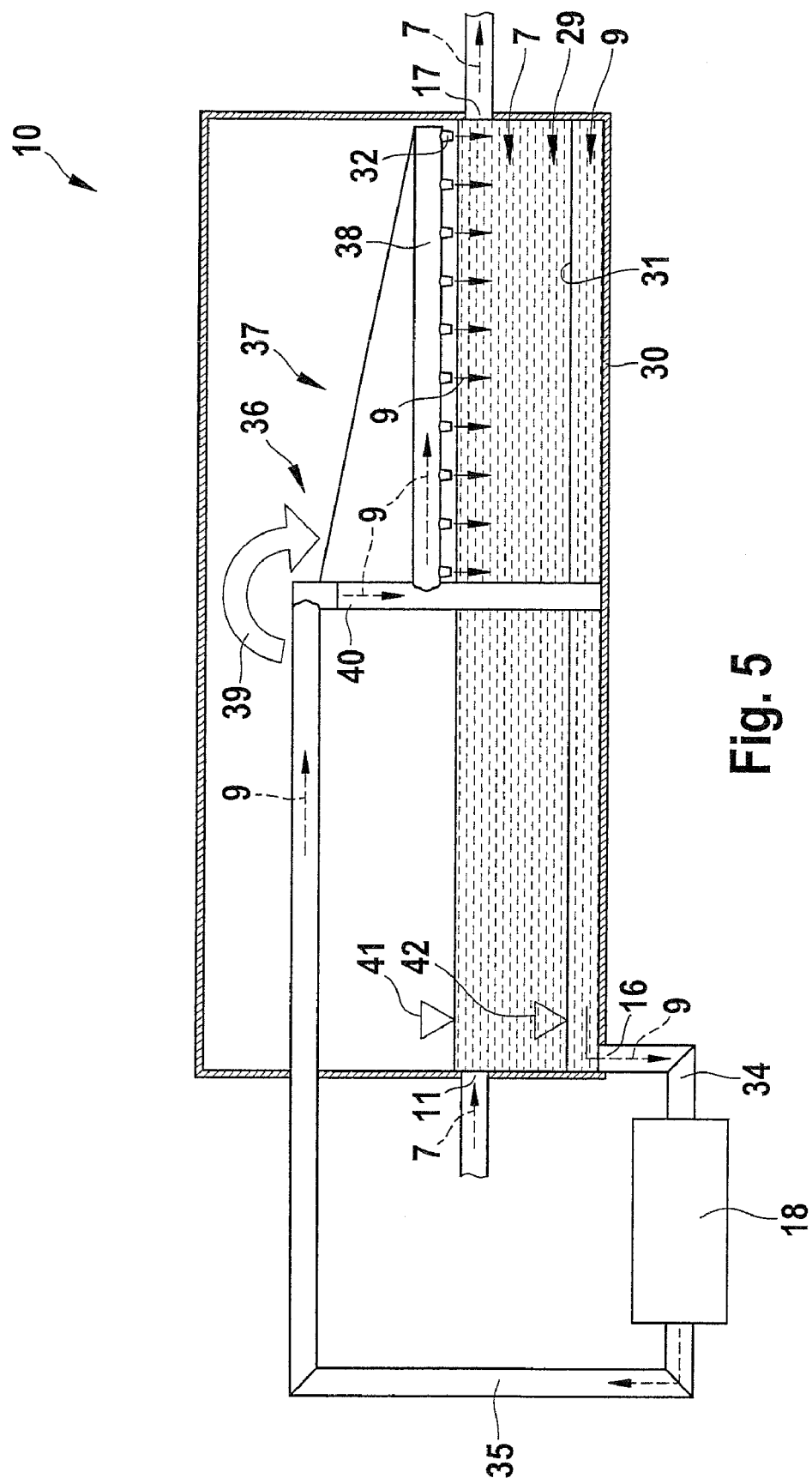
FIG. 5 shows a schematic illustration of a preparation unit for a deionizing agent, for instance as part of an element in the illustration in FIG. 3.

FIG. 5 shows a further possible embodiment of a coolant preparation unit 8, in which the mixing unit 10 and the separation unit 14 are combined into one unit. The inlet for the cooling medium 7 to be cleaned is again marked 11; its outlet, corresponding to the above arrangements, is identified by reference numeral 17. The outlet for the ion extraction medium 9 is correspondingly marked 16 and communicates via a line 34 with the preparation unit 18. The preparation unit 18 is in turn in communication with the housing 30, via the line 35 that is provided as a return for the ion extraction medium prepared in it and cleaned of the foreign ions. For the connection, an inlet 36 is provided, which may optionally also be embodied as open. The supply of the ion extraction medium 9 may, however, preferably be done via injection nozzles 32 that are embodied at a line 38 of a dispenser unit 37. The line 38 is rotatable about the axis 40, as indicated by the arrow 39, so that during a rotary motion of the line 38, the nozzles 32 aimed at the cooling medium inject or spray simultaneously into the cooling liquid that is to be cleaned. As a result, a homogeneous subjection of the cooling medium to be cleaned to the ion extraction medium can be attained.

Reference numeral 41 indicates the level of cooling liquid 7 to be cleaned, and reference numeral 42 indicates the level of the ion extraction medium 7. This level coincides with the two-phase boundary 31 that is located between the cooling medium to be cleaned and the ion extraction medium 9.

It will be understood that each of the elements described above, or two or more together, may also find a useful application in other types of constructions differing from the type described above.

While the invention has been illustrated and described as embodied in a fuel cell cooling device, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by letters Patent is set forth in the appended claims:

1. A fuel cell cooling device, comprising:
    a cooling loop for circulating a coolant fluid; and
    an ion extraction medium which is in a liquid state and is provided at least during an operation of the fuel cell, and wherein said ion extraction medium is an ionic liquid.
2. A fuel cell cooling device as defined in claim 1; and further comprising a mixing unit provided for mixing the coolant fluid with the ion extraction medium.
3. A fuel cell cooling device as defined in claim 1; and further comprising dispersal means for a medium from the group consisting of the coolant fluid, the ion extraction medium, and both.
4. A fuel cell cooling device as defined in claim 3, wherein said dispersal means include at least one device selected from the group consisting of an injection device, a spray device, and an injection and spray device for mixing the ion extraction medium with the coolant fluid.
5. A fuel cell cooling device as defined in claim 1; and further comprising a turbulence generating unit.
6. A fuel cell cooling device as defined in claim 1; and further comprising a separating unit for separating the ion extraction medium from the coolant fluid.
7. A fuel cell cooling device as defined in claim 1; and further comprising a preparation unit for the ion extraction medium.
8. A fuel cell cooling device as defined in claim 1; and further comprising a second cooling loop for the ion extraction medium.
9. A fuel cell cooling device as defined in claim 1; and further comprising means for precipitating foreign ions out of the ion extraction medium by electrochemical precipitation.
10. A fuel cell cooling device as defined in claim 1; and further comprising means for furnishing a cleaned ion extraction medium to the cooling loop again for an ion extraction.
11. A method for operating a fuel cell cooling device, comprising the steps of:
    circulating a coolant fluid in a coolant loop;
    performing an ion extraction from the coolant fluid at least during an operation of the fuel cell by an ion extraction medium which is in a liquid state; and
    using an ionic liquid as the ion extraction medium that extracts ions.
12. A method as defined in claim 11; and further comprising performing the ion extraction continuously.

* * * * *